United States Patent Office 3,322,728
Patented May 30, 1967

3,322,728
SULFONYL AROMATIC POLYAMIDES
Harold Wayne Hill, Jr., Bartlesville, Okla., and Stephanie Louise Kwolek and Wilfred Sweeny, Wilmington, Del., assignors to E. I. du Pont de Nemours and Company, Wilmington, Del., a corporation of Delaware
No Drawing. Filed June 17, 1963, Ser. No. 288,540
5 Claims. (Cl. 260—78)

This invention relates to novel polymers and to shaped structures prepared therefrom. More specifically, it relates to high molecular weight aromatic polyamides having unusually high melting points. This application is a continuation in part of our copending application Ser. No. 774,156, filed Nov. 17, 1958, now Patent No. 3,094,511.

Polyamides have found wide commercial acceptance, because they can be formed into strong abrasion-resistant fibers and films. As discussed in the aforementioned application, several desirable properties notably high temperature softening point and resistance to high temperature degradation had not been achieved in polyamides prior to our invention. For example, polyamides disclosed in U.S. 2,130,948 have relatively low melting points, and degrade rapidly in the presence of air at temperatures as low as 200° C. More important, they lose a substantial portion of their strength at temperatures much lower than their melting points. Polyamides disclosed in U.S. 2,244,192 show little tendency to crystallize to a dimensionally-stable structure, soften at temperatures considerably below their melting points and exhibit an undesirable amber color which renders them unsuitable for many purposes. Cold-drawn filaments prepared from these polyamides tend to retract or shrink at temperatures considerably below their melting points due, in part, to lack of crystallinity, and degrade rapidly at their melting temperatures. There had been a need for high molecular weight polyamides which are strong and stable at high temperatures and suitable for forming into filaments and films having water-white clarity. Polymetaphenylene isophthalamide of high molecular weight, disclosed in the aforementioned application along with several of its homologues, provided highly desirable properties, but these products are often so intractable that expensive procedures and materials are required to shape them into fibers and films.

It is an object of this invention to produce a new and useful class of high molecular weight aromatic polyamides formable into films and filaments by economical processes.

Another object is to provid an aromatic polyamide having inherent viscosity of at least 0.6 which has relatively high solubility in commercial solvents.

A still further object is to provide high molecular weight, wholly aromatic polyamides having a high melting point and good solubility.

These and other objects will become apparent from the following specification and claims.

In accordance with the present invention there is provided a high molecular weight polymer containing a recurring structural unit from the class consisting of

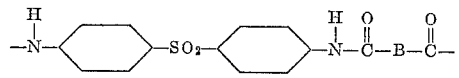

and

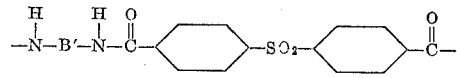

wherein B is a member of the class consisting of

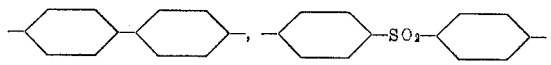

and

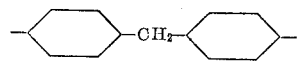

B' is a member of the class consisting of

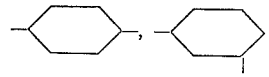

and B and the hexagon represents the benzene nucleus.

High molecular weight polymers of this invention are prepared by interfacial or solvent polymerization by reacting an aromatic diacid chloride with an aromatic diamine, the acid groups of the diacid chloride and the amine groups of the diamine being meta or para oriented relative to each other, at low temperatures (below 100° C.). These processes are described in United States Patent No. 2,831,834 to Magat (Apr. 22, 1958) and United States Patent No. 3,063,966 to Kwolek, Morgan and Sorenson (Nov. 13, 1962).

Polymers of this invention are characterized by an exceptionally high melting point. Whereas known polyamides melt at temperatures below about 270° C., generally the polyamides of this invention have melting points in excess of 350° C. and in many instances above 400° C. Moreover, filaments of polyamides of this invention retain their filament form at temperatures of about 350° C. Polymers of this invention are also distinguished from known polyamides in having water-white color, excellent resistance to corrosive atmospheres, substantially no flammability, and outstanding resistance to degradation by high energy particle and gamma ray radiation. These polymers resist melting upon exposure to 300° C. for extended periods while retaining hitherto unrealized high proportion of room temperature physical properties. Flash exposure for 20 seconds to temperatures as high as 700° C. does not destroy these fiber properties. Because of their solubility, these polymers may be processed into shaped structures such as films and filaments by conventional techniques. These polymers have high tenacity, good work recovery, high flex life at elevated temperatures, and are readily crystallizable.

The following examples illustrate the invention. All parts and percentages are by weight unless otherwise indicated. Unless otherwise indicated inherent viscosity reported in the examples is determined in sulfuric acid (sp gr. 1.841 at 60° F.), at 30° C. at a concentration of 0.5 gram polymer per 100 cc. of solution. All polymers of this invention have an inherent viscosity of at least about 0.6 on this basis and a melting point of at least about 350° C.

*Example 1* m-Phenylenediamine (2.163 g.) is dissolved in 30 ml. of dimethylacetamide and the solution is cooled in a pack of solid carbon dioxide. Bis(4-chlorocarbonylphenyl) sulfone (6.864 g.) is added and the mixture is stirred for 3 hr. while surrounded by an ice-water bath.

The polymer is isolated by pouring the solution into rapidly stirred water. The washed and dried product is obtained in 100% yield and has an inherent viscosity of 1.03 ($H_2SO_4$). The polymer does not melt below 400° C.

It forms a heat-stable 20% solution in hot dimethylformamide.

*Example 2*

Bis(4-aminophenyl)methane (2.48 g.) and 2.53 g. of triethylamine are dissolved in 50 ml. of anhydrous, alcohol-free chloroform. With vigorous stirring is added a solution of 4.29 g. of bis(4-chlorocarbonylphenyl) sulfone in 250 ml. of chloroform.

Stirring is continued 5 min. and the mixture stands overnight (the latter step is unnecessary). The mixture is then poured into one liter of methanol and the polymer is collected, washed and dried; yield 96%.

The polymer does not melt below 400° C. It is soluble in amide solvents, such as dimethylacetamide or N-methylpyrrolidone, to which small amounts (5–10%) of lithium chloride or calcium chloride have been added.

*Example 3*

Bis(4-aminophenyl) sulfone (2.483 g.) and 2.985 g. of N,N-diethylaniline are dissolved in 50 ml. of 2,4-dimethyltetramethylene sulfone in a round-bottom flask equipped with a stirrer. To the solution is added dropwise a solution of 2.791 g. of 4,4'-bibenzoyl chloride in mixture of 70 ml. of 2,4-dimethyltetramethylene sulfone and 30 ml. of dry acetone. There is precipitation of material toward the end of the acid chloride addition. The mixture is stirred for a total of 30 min. and then the flask is heated with stirring for 30 min. on a steam bath.

The polymer is isolated by pouring the reaction mixture into vigorously stirred water. After collection, thorough washing and drying, there is obtained a 97% yield of product having an inherent viscosity of 0.88 ($H_2SO_4$), which does not melt below 400° C.

The polymer is soluble to at least 20% solids in dimethylacetamide and N-methylpyrrolidone. These solutions do not gel on holding for 2 hrs. or more at 120° C. Clear, tough, flexible films are cast from this product.

*Example 4*

A preparation is carried out in a manner similar to that of Example 3. In this case 50 ml. of solvent is used for the diamine and the acid chloride solution consists of 3.432 g. of bis(4-chlorocarbonylphenyl) sulfone in 70 ml. of 2,4-dimethyltetramethylene sulfone. The mixture is stirred 2 hr. at ambient temperature and the system remains homogeneous.

A fibrous, high molecular weight polymer is obtained in 100% yield by precipitation in water. It does not melt below 375° C. and produces viscous, heat-stable solutions in dimethylformamide, dimethylacetamide, and dimethyl sulfoxide.

Among the starting materials suitable for preparing polymers of the present invention are included (A) diamines such as p-phenylenediamine, benzidine and 2,2-bis(p-aminophenyl) propane and B diacid chlorides such as bis(4-chlorocarbonylphenyl)methane, bis(4-chlorocarbonylphenyl)sulfone, 2,2 - bis(4 - chlorocarbonylphenyl)propane and 4,4'-bibenzoyl chloride. Copolymers of these reactants and those employed in the specific examples can be made in any proportion by mixture of appropriate diamines and/or acids. In addition, up to about 10% polymer-forming ingredients which may or may not contain an aromatic nucleus can be included without seriously detracting from the extraordinary physical and chemical properties of the polymers of this invention. Typical aliphatic copolymerizable starting materials include diamines such as ethylene diamine, tetraethylene diamine, hexa-methylene diamine, decamethylene diamine and the like and dibasic acids such as malonic, adipic, and sebacic. Preferably, however, the diamine and diacid compounds utilized will be wholly aromatic, thus resulting in a polymer characterized entirely by structural units with all of the nuclei containing aromatic radicals. Typical aromatic copolymerizable starting materials include diamines such as m-phenylene diamine, p-phenylene diamine, 2,6-dichloro-p-phenylene diamine, bis(4-aminophenyl)methane, 3,3'-dichlorobenzidine, p-xylylenediamine and the like and dibasic acids such as isophthalic, terephthalic, bis(4-carboxyphenyl)sulfone, bis(4-carboxyphenyl ether, bibenzoic acid and the like. In addition alicyclic copolymerizable starting materials such as hexahydro-p-phenylene diamine and hexahydroterephthalic acid as well as heterocyclic materials such as piperazine and the like may be employed. The nature of the linking radical in the chain is not critical in the copolymeric component of the chain and may be other than carbonamide. For instance the linkage of the copolymeric component may be sulfonamide (by substituting a disulfonic acid for a minor proportion of dicarboxylic acid), ester (by substituting a glycol for a minor proportion of diamine), urethane (by substituting a bischloroformate for a minor proportion of dicarboxylic acid) or urea (by substituting phosgene for a minor proportion of dicarboxylic acid).

The polymers of the present invention find application in a wide variety of physical shapes and forms. Among the most significant of these forms are fibers and films. The useful combination of desirable physical and chemical characteristics of these polymers are unique. Fibers and films of these polymers not only possess excellent physical properties at room temperatures, but retain their strength and excellent response to work-loading at elevated temperatures for prolonged periods of time. Behavior of this type offers commercial utility in a wide range of end uses. In fiber form the polymers offer possibilities for high temperature electric insulation, protective clothing and curtains, filtration media, packing and gasketing materials, brake linings and clutch facings. In the aircraft industry these materials can be used in parachutes, fuel cells, tires, ducts, hoses and insulation. In atomic energy applications the remarkable resistance to radiation with retention of physical properties as well as thermal stability is important. Cordage for tires and conveyor belts, particularly where such materials would be subject to prolonged high temperature exposure is another application. Press cloths in the dry cleaning industry prepared from such fibers have extremely hydrolytic stability. In the form of films, these polymers may be used in automotive and aviation interior head lining materials, decorative trim, high temperature electrical insulation, such as for slot liners, use in dry transformers, capacitors, cable wrappings, etc. packaging of items to be exposed to high temperature or high energy radiation while within the package, corrosion resistant pipe, hot water pipe, duct work, hot air ventilation, aircraft body skins, aircraft radomes, embossing roll covers, containers and container linings, printed circuits, tape for hot pipe overwrapping, laminated structures where the films are bonded to metal sheets or foils, mold liners or self-sustaining containers for casting low-melting (below 300° C.) fusible materials, including metals, and a variety of other similar and related uses.

Many equivalent modifications of the above will be apparent to those skilled in the art from a reading of the above without a departure from the inventive concept.

1. A linear fiber-forming, synthetic polycarbonamide wherein recurring carbonamide linkages are an integral part of the polymer chain from the class consisting of a homopolymer and a copolymer, the said homopolymer and copolymer consisting essentially of recurring units of the class consisting of

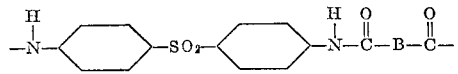

and

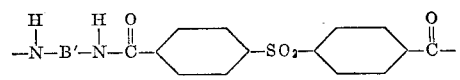

wherein B is a member of the class consisting of

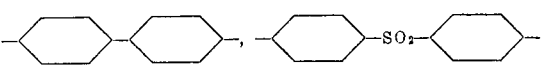

and

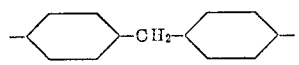

B′ is a member of the class consisting of

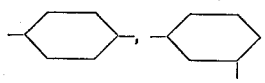

and B and the hexagon represents the benzene nucleus.

2. A high molecular weight polymer consisting essentially of recurring units of the formula:

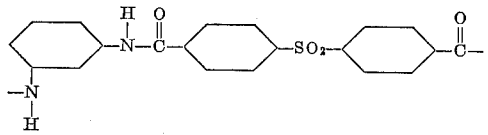

wherein the hexagon represents the benzene nucleus.

3. A high molecular weight polymer consisting essentially of recurring units of the formula

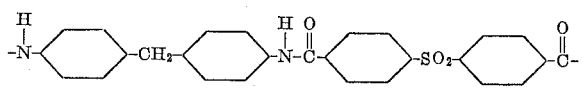

wherein the hexagon represents the benzene nucleus.

4. A high molecular weight polymer consisting essentially of recurring units of the formula

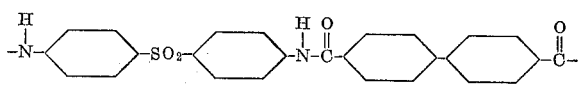

wherein the hexagon represents the benzene nucleus.

5. A high molecular weight polymer consisting essentially of recurring units of the formula

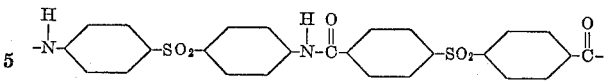

wherein the hexagon represents the benzene nucleus.

References Cited
UNITED STATES PATENTS

| | | | |
|---|---|---|---|
| 2,244,192 | 6/1941 | Flory | 260—78 |
| 2,252,554 | 8/1941 | Carothers | 260—78 |
| 2,277,125 | 3/1942 | Martin | 260—78 |
| 2,621,168 | 12/1952 | Ross et al. | 260—78 |
| 2,625,536 | 1/1956 | Kirby | 260—78 |
| 2,756,221 | 7/1956 | Caldwell | 260—78 |
| 2,766,222 | 10/1956 | Lum et al. | 260—78 |
| 2,831,834 | 4/1958 | Magat | 260—78 |
| 3,094,511 | 6/1963 | Hill et al. | 260—78 |
| 3,206,438 | 9/1965 | Jamison | 260—78 |

FOREIGN PATENTS

| | | |
|---|---|---|
| 1,112,203 | 11/1955 | France. |
| 745,029 | 2/1944 | Germany. |
| 614,625 | 12/1948 | Great Britain. |
| 631,020 | 10/1959 | Great Britain. |
| 632,997 | 12/1949 | Great Britain. |

WILLIAM H. SHORT, *Primary Examiner.*

H. D. ANDERSON, *Assistant Examiner.*